No. 680,788. Patented Aug. 20, 1901.
W. J. KNOX.
APPARATUS FOR THE MANUFACTURE OF GAS.
(Application filed Nov. 12, 1900.)

(No Model.)

WITNESSES:
C. L. Belcher
Wm. H. Capel
J. H. Jones

INVENTOR
William John Knox
BY
Charles A. Perry
ATTORNEY

UNITED STATES PATENT OFFICE.

WILLIAM JOHN KNOX, OF PITTSBURG, PENNSYLVANIA, ASSIGNOR TO GEORGE WESTINGHOUSE, OF SAME PLACE.

APPARATUS FOR THE MANUFACTURE OF GAS.

SPECIFICATION forming part of Letters Patent No. 680,788, dated August 20, 1901.

Application filed November 12, 1900. Serial No. 36,269. (No model.)

*To all whom it may concern:*

Be it known that I, WILLIAM JOHN KNOX, a citizen of the United States, and a resident of Pittsburg, in the county of Allegheny and State of Pennsylvania, have invented certain new and useful Improvements in Apparatus for the Manufacture of Gas, of which the following is a specification.

The object of my invention is to provide an improved apparatus for the manufacture of gas; and to this end my invention consists in an apparatus whereby fuel-gas or illuminating-gas, or both, may be economically produced from any carbonaceous material—such as coal, coke, wood, charcoal, sewage, garbage, or any material consisting largely of carbon or carbonaceous material, either with or without contained water.

Figure 1:
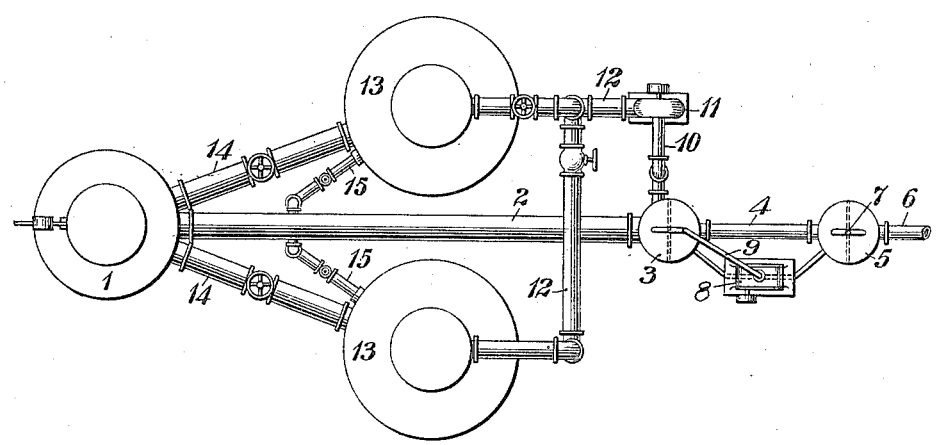
Figure 2:
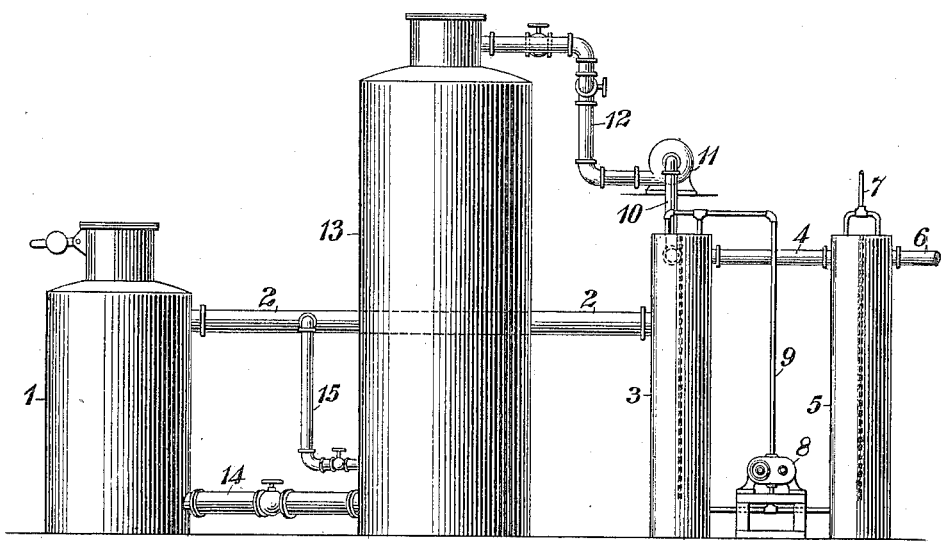

In the accompanying drawings, Figure 1 is a plan view, and Fig. 2 an elevation, of an apparatus for carrying out my invention.

The object of any economical process for the production of gas should be the conversion of gas into fuel of high calorific value with the smallest possible loss of the original heat energy of the fuel. This object has not been attained in practice up to the present time. For example, bench-gas or gas obtained by destructive distillation, although high in calorific value, contains but a small percentage of the original heat energy of the fuel, and hence the process is not economical. On the other hand, producer-gas or gas made by incomplete combustion of fuel, although retaining a large percentage of the total heat value of the original fuel, is so low in calorific value per unit of volume as to be useless except for immediate local consumption, whereby its sensible heat may be utilized, and it carries so large a percentage of inert gas—that is, nitrogen—that regenerative-furnaces must be used to recover the waste heat from its products of combustion and to give a sufficiently-high-flame temperature. Water-gas as now manufactured is, like distilled gas, sufficiently high in calorific power and intensity, but in the process too large a percentage of the heat energy of the original fuel is lost to permit of an economical production of gas. This loss is due to the fact that the reaction represented by the decomposition of steam in the presence of carbon is endothermic. Hence the temperature of the producer is lowered by the decomposition of the steam to a point at which reaction practically ceases to take place and the process must be periodically interrupted for the purpose of providing a supply of heat to be employed during the next period of gas-making. This heat is supplied by a very uneconomical process—that is, by blowing air through the bed of fuel, generating large volumes of products of incomplete combustion, which leave the producer at a high temperature. The volume of these products is so large compared with the volume of water-gas that they carry the larger part of the original value of the fuel in the producer, and the result is that the process requires the generation of a large quantity of producer-gas. This producer-gas leaves the producer at a very high temperature, and therefore carries off a large quantity of sensible heat, and this waste gas cannot ordinarily be utilized on account of its large volume and poor quality. Therefore the quantity of valuable gas generated in a water-gas plant is insignificant as compared with the quantity of worthless producer-gas, and it may be said that in such water-gas plants the main product is wasted and the smaller quantity only is utilized.

It may be stated generally that the efficient generation of heat within a producer designed for gas-making is inherently unattainable by the combustion of its carbonaceous contents. The very fact that the depth of fuel is sufficient to decompose the carbonic acid liberated in the generation of gas and convert it into carbon monoxid prevents the complete combustion of the carbon in the producer when blowing up to incandescence. The incomplete combustion of unit weight of carbon—that is, its conversion into carbon monoxid—liberates as sensible heat only thirty per cent. of the total heat energy of the fuel. The remaining seventy per cent. passes off undeveloped in the products of such incomplete combustion, together with a large portion of the thirty per cent. liberated as sensible heat within the producer. This loss is due to the large volume and high temperature of the waste gases. It is easily seen that this loss of sensible heat is large when it is considered that, based on the amount of heat liberated, the products of incomplete combustion are twice as large in volume as the products of complete combustion, and their temperature is necessarily nearly as high as the temperature of the fuel in the producer. My improved apparatus is specially applicable to the manufacture of gas in which a supply of heat is necessary for the purpose of counterbalancing the losses of heat due to endothermic reaction within the generator, and the principal object of my invention is to economically supply such heat.

My invention is applicable to the manufacture of any gas in the generation of which reaction is endothermic, such as water-gas or destructively-distilled gas; but it is especially applicable in the manufacture of water-gas, and comprises a new and improved apparatus in which a combustible gas is employed as a carrier for introducing heat into the producer and for lowering the temperature of dissociation.

In the manufacture of water-gas the reaction between the carbon and its chemical equivalent of steam is endothermic. If the heat required for the reaction could be supplied to the producer by superheating such equivalent of steam economically to such a temperature that it would contain heat energy enough for its own decomposition, we would have a better process than the one mentioned above; but as the specific heat of steam is only approximately 0.4805 the total thermal capacity of the carbon equivalent at practicable temperatures is not sufficient to carry the necessary amount of heat for the reaction, and hence any process involving the superheating of such steam would be impracticable on account of what may be called "the lack of heat-carrying capacity of the steam." In accordance with my invention I provide a carrier for the introduction of heat energy into the producer, which consists of already-produced gas or gas produced in the gas-making process within the system, and by means of which the process may be carried out at practicable temperatures and without limitation by the specific thermal capacity of the carrier, the quantity of heat carried depending upon the volume of the carrier only at any desired temperature. It will be readily seen that in providing a carrier of sufficient capacity to convey a required amount of heat three factors are to be considered—that is, specific heat, practicable working temperature, and volume or mass. I obtain sufficient thermal capacity by an increase of mass, thus obviating the difficulties due to the limitations of temperature and specific heat. In thus adding a sufficient amount of already-produced gas to the steam to carry the required heat energy at the most desirable working temperature I also secure another important advantage—namely, the lowering of the temperature of dissociation. In practice I have found that by mingling with the steam a quantity of gas—such, for instance, as that being circulated—the dissociation of the steam in the presence of carbon takes place more readily, and thus the temperature at which the operation may be carried on may be lowered several hundred degrees. This is probably due to the fact that the dilution of the steam by the other gas increases the separation of the molecules of the steam.

Another important advantage is found in the application of my improved apparatus to destructive distillation. Instead of supplying heat to the generator through thick walls, as in the bench-gas process, I am enabled to use a generator with a wall sufficiently thick to prevent radiation and by passing a large volume of already-produced gas through the material undergoing destructive distillation to remove the volatile portions more thoroughly and by regulating the temperature of the outgoing gas to control the degree to which the breaking up of the hydrocarbons shall be carried. This application is of special advantage in destructive distillation in connection with the production of water-gas.

In carrying out this invention a sufficient amount of gas taken from gas already produced is passed through a heater or stove of efficient form, in passing through which it absorbs heat in sufficient quantity and of proper temperature to secure the desired reaction in the producer. In the ordinary application of my invention the gas is circulated from the producer through a cooling device or steam-generator, and a volume of gas large enough to carry sufficient heat energy to accomplish the dissociation of the desired amount of steam is transmitted through a stove or superheater back into the producer. The steam necessary for the reaction in the producer is generated within the system by the sensible heat of the gas passing from the producer. A scrubber may be employed in which a spray of water is directly evaporated by the sensible heat of the outgoing gas before it is returned to the superheater, the mixture of gas and steam then being delivered to the superheater and passed through it to the producer. The heater, stove, or superheater in which heat is applied to the carrier may be heated by fuel from any convenient source.

In an application filed by me October 5, 1900, Serial No. 32,115, claims are made to the process described herein. In application Serial No. 36,265, filed November 12, 1900, and application Serial No. 36,443, filed November 14, 1900, claims are made to an apparatus and a method of operation in some respects allied to the apparatus and method described herein, and in those applications broad claims are made to the feature of heating the circulating gas before delivering it to the producers and abstracting heat therefrom after it passes from the producers, whereby its temperature is reduced to the point required for economical reheating by means of the stoves.

In the drawings which illustrate an application of my invention the producer 1 is connected by means of a pipe 2 with a scrubber and steam-generator 3. This scrubber is connected by means of a pipe 4 with a scrubber and condenser 5, which is preferably kept at a lower temperature than 212° Fahrenheit, so that any steam that may enter the scrubber 5 will be condensed and pumped into the scrubber 3. After its passage through the scrubber 5 the gas passes off through the pipe 6 to a holder or distributing-main. Water is supplied to the scrubber 3 through the pipe 7, and after falling through the current of gas is withdrawn by the pump 8 and discharged through the pipe 9 into the scrubber 3 at its top. The water, which has already absorbed heat from the gas in the scrubber 3, falls in a spray or shower through the hot gas in the scrubber 3, and a portion or all of it is converted into steam. In case of the incomplete evaporation of the water in passing through the gas any water reaching the bottom of the scrubber 3 may be returned by the pump 8 to the top of the scrubber and again passed through the hot gas. It will thus be seen that by regulating the supply of water to the scrubber 3 the sensible heat of the gas after leaving the producer may be efficiently utilized in the generation of steam. The steam generated in the scrubber 3, together with the necessary volume of gas, is drawn off through the pipe 10 by a fan or other suitable device 11 and is forced through the pipe 12 into one of the stoves or superheaters 13, from which it is discharged into the producer 1 through the pipe 14 after having the desired amount of heat imparted to it in its passage through the stove or superheater.

The superheaters 13 are adapted to be heated alternately by gas, which may be supplied from the pipe 2, through the pipes 15. The gas supplied through these pipes is burned in the stove, the requisite amount of air being supplied through any suitable form of burner in any well-known manner. Gas for giving the initial heat in starting the plant may be employed from any suitable source of gas—such, for instance, as a small distillation plant—and thereafter the gas used for heating the stoves may be taken either from the system or from such supplemental producer, or, if desired, other forms of fuel may be employed in starting the plant. After one of the stoves or superheaters has been heated the gas from the scrubber is passed through it in order to absorb heat before reaching the producer, and during this time the other stove or superheater is being heated. When the first superheater has been heated to a certain degree, the passage for the mixed gas and steam is heated by passing therethrough while the second superheater is being supplied with heat.

It will be seen that in the producer I employ steam which is generated within the system in a very efficient manner—that is, by actual contact and mixture of the hot gas and water—and the heat utilized for this purpose is the sensible heat of the gas discharged from the producer, and which therefore is not permitted to go to waste. The steam after being charged into the producer is decomposed, and the heat necessary to the endothermic reaction by which this decomposition is effected is supplied by the heated gas with which the steam is mixed and which has been charged into the producer with it. There is no necessity for otherwise supplying heat to the producer, and the supply of gas or steam and gas to the producer is continuous, so that the generation of gas from the carbonaceous material or from the steam and carbonaceous material goes on uninterruptedly, and the result is a continuous generation of gas.

My invention is not limited to the particular construction and arrangement of apparatus shown.

In my process, by means of this carrier, which is not foreign to the materials employed or produced, I am enabled to generate the heat necessary to carry on the endothermic reaction in the most economical manner and to take up this heat and carry it to the interior of the producer in a highly-efficient manner. This advantage is equally beneficial in the production of water-gas or distilled gas. By diluting my equivalent of steam I am enabled to lower the dissociation-point of the steam or to increase its rate of dissociation at any given temperature.

The invention claimed is—

1. The combination of a gas-producer, two stoves for heating gas to be delivered to the producer, a gas-cooling device, consisting of a steam-generator, means for connecting the producer and the steam-generator in closed series with the two stoves alternately, means for forcing a current of gas from the producer through the steam-generator and thence into the stove connected in series, and a gas-outlet from the system, substantially as described.

2. The combination of a gas-producer, two stoves for heating gas to be delivered to the producer, a steam-generator, means for connecting the hot end of either stove with the producer, means for connecting the steam-generator with the cold end of the stove, thus connected with the remaining end of the producer, means for heating the stove, not thus connected, by the combustion of gas produced in the system, and a gas-outlet from the system.

3. The combination of a gas-producer, a steam-generator, two stoves for heating gas to be delivered to the producer, means for connecting the steam-generator and the producer in closed series with the two stoves alternately, the steam-generator being connected with the cold end of the stove, and a fan or equivalent device for forcing gas to circulate through said series, an outlet from the system, a condenser located therein, and means for conveying heated water from the condenser to the steam-generator, substantially as described.

4. The combination of a gas-producer, a stove for heating gas to be delivered thereto, means for circulating a portion of the produced gas through the stove and into the producer, means for cooling the gas located between the outlet of the producer and the cold end of the stove, and thereby storing heat extracted from the gas, and means for returning more or less of the heat thus extracted to the producer, and means for withdrawing from the system the portion of the gas not circulated.

5. In an apparatus for the manufacture of gas, the combination of a producer, a steam-generator, a stove or superheater, a connection from the producer to the steam-generator, whereby heat carried by the gas from the producer is stored, means for conveying the heat thus stored back to the producer, a passage from the steam-generator to the stove or superheater, a connection from the stove to the producer, means for circulating gases through the closed system thus formed, and a gas-outtake from the system.

Signed at Pittsburg, in the county of Allegheny and State of Pennsylvania, this 7th day of November, A. D. 1900.

WILLIAM JOHN KNOX.

Witnesses:
J. A. ADAMS,
R. J. BRATTON.